United States Patent
Beardow et al.

(10) Patent No.: US 10,158,756 B2
(45) Date of Patent: Dec. 18, 2018

(54) METHOD FOR PROCESSING DATA ASSOCIATED WITH A CALLER PARTY, AND EQUIPMENT FOR IMPLEMENTING THE METHOD

(71) Applicant: ORANGE, Paris (FR)

(72) Inventors: Paul Beardow, Paris (FR); Yoann Huiban, Lannion (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 15/856,766

(22) Filed: Dec. 28, 2017

(65) Prior Publication Data
US 2018/0191896 A1 Jul. 5, 2018

(30) Foreign Application Priority Data
Dec. 30, 2016 (EP) .................................. 16306850

(51) Int. Cl.
*H04M 11/00* (2006.01)
*H04M 1/56* (2006.01)
(Continued)

(52) U.S. Cl.
CPC ....... *H04M 3/436* (2013.01); *H04M 1/72583* (2013.01); *H04M 3/42042* (2013.01); *H04M 2201/12* (2013.01); *H04M 2201/18* (2013.01); *H04M 2201/42* (2013.01); *H04M 2203/556* (2013.01); *H04M 2203/6027* (2013.01)

(58) Field of Classification Search
CPC .......... H04M 1/7385; H04M 2201/18; H04M 2250/60; H04M 3/436; H04M 1/665; H04M 1/663; H04M 1/642; H04M 1/57; H04M 3/42068; H04M 3/42042; H04L 65/1059; H04L 65/608; H04L 67/306; H04L 65/1069; G06Q 10/10; G06F 17/30283;
(Continued)

(56) References Cited

U.S. PATENT DOCUMENTS 8,135,119 B1 * 3/2012 Zhao .................... H04M 1/57
370/352
9,002,333 B1 4/2015 Tong et al.
(Continued)

OTHER PUBLICATIONS

European Search Report and Written Opinion dated May 24, 2017 for corresponding European Application No. 16306850, filed Dec. 30, 2016.

*Primary Examiner* — Binh Kien Tieu
(74) *Attorney, Agent, or Firm* — David D. Brush; Westman, Champlin & Koehler, P.A.

(57) ABSTRACT

A method for processing data associated with a caller party upon setup of an incoming communication is proposed. The method includes: obtaining, from received signaling data associated with the communication, caller party identification data; transmitting a request for qualification of the nature of the caller party including the caller party identification data; receiving, in response to the request, qualification information on the nature of the caller party including respective likelihood indicators for each of one or more categories to which the caller party corresponds; and reporting incoming communication acceptability information that includes the likelihood indicators for each of the one or more categories through a user interface.

12 Claims, 4 Drawing Sheets

(51) Int. Cl.
    *H04M 15/06*    (2006.01)
    *H04M 3/436*    (2006.01)
    *H04M 3/42*     (2006.01)
    *H04M 1/725*    (2006.01)

(58) Field of Classification Search
    CPC ......... G06F 17/30864; G06F 17/30952; G06F 21/6227
    USPC .... 379/93.17, 93.23, 142.01, 142.05, 142.17
    See application file for complete search history.

(56) References Cited

U.S. PATENT DOCUMENTS

| | | | |
|---|---|---|---|
| 2008/0084975 A1* | 4/2008 | Schwartz | H04M 3/436 379/88.22 |
| 2015/0163354 A1* | 6/2015 | Nezarati | H04M 3/42042 379/142.04 |
| 2015/0254368 A1* | 9/2015 | Bergin | G06Q 10/10 707/722 |
| 2016/0119470 A1* | 4/2016 | Nezarati | H04M 3/42042 709/204 |
| 2016/0360036 A1 | 12/2016 | Ansari | |

\* cited by examiner

METHOD FOR PROCESSING DATA ASSOCIATED WITH A CALLER PARTY, AND EQUIPMENT FOR IMPLEMENTING THE METHOD

CROSS-REFERENCE TO RELATED APPLICATION

This Application claims priority to and the benefit of European Application EP 16306850.5, filed on Dec. 30, 2016, the content of which is incorporated herein by reference in its entirety.

FIELD

The present disclosure relates to the field of telecommunications.

BACKGROUND

Mobile subscribers are frequently interrupted by "spam" calls from unknown persons that not only waste time but can also lead to excessive charges on the subscriber's phone bill. These unsolicited calls may come from telemarketing companies, robots (unsolicited calls being in such case sometimes referred to "robocalls"), fraudsters, and aggressive sales organisations. Sometimes the call is simply to sell a new service, encourage the subscriber to make a claim against a third party, but can also be an inducement to call back a number that has premium rate charges associated with it.

Calls can be blocked afterwards on most phones, but this means that the subscriber has to accept the call and determine for himself or herself whether the caller is legitimate or not. In some cases, a subscriber can receive many such calls a day and may have to eventually resort to keeping their phone on silent mode so as to not be disturbed or in the extreme obtaining a new MSISDN, both of which are inconvenient and can lead to missing important calls.

There is therefore a need for a method to assist users in avoiding the drawbacks of undesired calls.

SUMMARY

An aspect of the present subject disclosure relates to a method for processing data associated with a caller party upon setup of an incoming communication, is proposed. The method comprises, at a communication device, obtaining, from received signaling data associated with the communication, caller party identification data, transmitting a request for qualification of the nature of the caller party comprising the caller party identification data, receiving, in response to the request, qualification information on the nature of the caller party comprising respective likelihood indicators for each of one or more categories to which the caller party corresponds in a first group comprising a malicious category, a commercial category, and an acceptable category, reporting incoming communication acceptability information that comprises the likelihood indicators for each of the one or more categories through a user interface of the communication device.

The malicious category may correspond in some embodiments to communications that may be harmful to the called party should such communication be taken, such as communications originated from callers with malicious intentions, callers reported by users or registered in databases as crooks or rogue callers, etc.

The commercial category may correspond in some embodiments to communications originated from telemarketers, marketing robots, etc.

The proposed method advantageously processes data received at a called party communication device for providing its user with information relevant to the determination as to whether it is desirable for the user to take an incoming call related to the received data. Such information can be used by the user as guidelines for decision making regarding an incoming call before taking the call.

In some embodiments, the caller party identification data may be obtained from received signaling data associated with the setup of the communication. In such cases, signaling data will be advantageously used to extract data that can be used for the generation of qualification information, which will decrease the processing time for generating such information.

In some embodiment, the reporting the likelihood indicators may be performed through a graphical user interface and/or an audio user interface of the communication device.

In some embodiments, the receiving the qualification information may comprise: receiving first, second, and third likelihood indicators for each of the malicious category, the commercial category, and the acceptable category.

This will advantageously provide further information to the called party in order to decide whether or not to pursue the incoming communication. Indeed, some called users may consider that as long as the malicious category likelihood indicator is not at zero level, or is not below a certain level, they will not pursue the incoming communication. Other users may consider the same with respect to the commercial category likelihood indicator, in addition to the malicious category likelihood indicator.

In some embodiments, the receiving the qualification information may further comprise: receiving likelihood indicators for each of one or more categories to which the caller party corresponds in a second group comprising a malicious category and a commercial category, and the proposed process may further comprise: determining a likelihood indicator for the acceptable category based on the received likelihood indicators. In such cases, the amount of qualification information received from a remote device will be advantageously reduced, as the last indicator is determined at the communication device.

In some embodiments, the proposed method may further comprise: determining a global acceptability indicator based on the received likelihood indicators, wherein the reported incoming communication acceptability information includes the global acceptability indicator. The global acceptability indicator may advantageously help the decision making process of the called party which is to be completed during the setup phase of the incoming communication in case such is a voice or video call for example.

In some embodiments, the incoming communication acceptability information may be reported through displaying a graphical user interface (GUI) on a touchscreen of the communication device, wherein the GUI displayed on the touchscreen includes a soft key for accepting the incoming communication, and a soft key for rejecting the incoming communication.

In some embodiments, the incoming communication acceptability information may be reported through displaying a graphical user interface (GUI) on a touchscreen of the communication device, wherein the GUI displayed on the touchscreen includes caller party identification data. Such additional information reported to the called party may advantageously be used to decide whether or not to pursue the incoming communication, regardless of the reported likelihood indicators, typically in cases where the caller party may be known to the called party. In other cases, the called party may decide to take an incoming communication, even though the caller party is reported with a strong commercial category likelihood indicator, in view of the reported identification data.

In some embodiments, the qualification information may include a number of user reviews used for generating the received likelihood indicators, and wherein the reported incoming communication acceptability information includes the number of user reviews. Such additional qualification information will advantageously provide the called party with information as to a level of confidence to be associated with reported likelihood indicators.

In another aspect, a communication device comprising a processor and a memory operatively coupled to the processor, wherein the processor is configured to perform any of the proposed methods for processing data associated with a caller party upon setup of an incoming communication of the present subject disclosure, is proposed.

In yet another aspect, a computer program product comprising computer program code tangibly embodied in a computer readable medium, said computer program code comprising instructions to, when provided to a computer system and executed, cause said computer to perform any of the proposed methods for processing data associated with a caller party upon setup of an incoming communication of the present subject disclosure, is proposed. A set of data representing, through compression or encoding, such a computer program, is also proposed, according to another aspect.

In another aspect, a non-transitory computer-readable storage medium storing a computer program that, when executed, causes a system comprising a processor operatively coupled with a memory, to perform a method for processing data associated with a caller party upon setup of an incoming communication, the method comprising: obtaining, from received signaling data associated with the communication, caller party identification data; transmitting a request for qualification of the nature of the caller party comprising the caller party identification data; receiving, in response to the request, qualification information on the nature of the caller party comprising respective likelihood indicators for each of one or more categories to which the caller party corresponds in a first group comprising a malicious category, a commercial category, and an acceptable category; reporting incoming communication acceptability information that comprises the likelihood indicators for each of the one or more categories through a user interface of a communication device, is proposed.

In yet another aspect, a server device comprising a processor, a memory operatively coupled to the processor, and a database operatively coupled to the processor, wherein the processor is configured to: receive a request for qualification of the nature of a caller party, the request comprising caller party identification data; generate, based on the caller party identification data, using data stored in the database, qualification information on the nature of the caller party comprising respective likelihood indicators for each of one or more categories to which the caller party corresponds in a first group comprising a malicious category, a commercial category, and an acceptable category; and transmit the qualification information to a communication device, is proposed.

It should be appreciated that the present invention can be implemented and utilized in numerous ways, including without limitation as a process, an apparatus, a system, a device, and as a method for applications now known and later developed. These and other unique features of the system disclosed herein will become more readily apparent from the following description and the accompanying drawings.

BRIEF DESCRIPTION OF THE DRAWINGS

The present subject disclosure will be better understood and its numerous objects and advantages will become more apparent to those skilled in the art by reference to the following drawings, in conjunction with the accompanying specification, in which.

DESCRIPTION OF EMBODIMENTS

Figure 1:
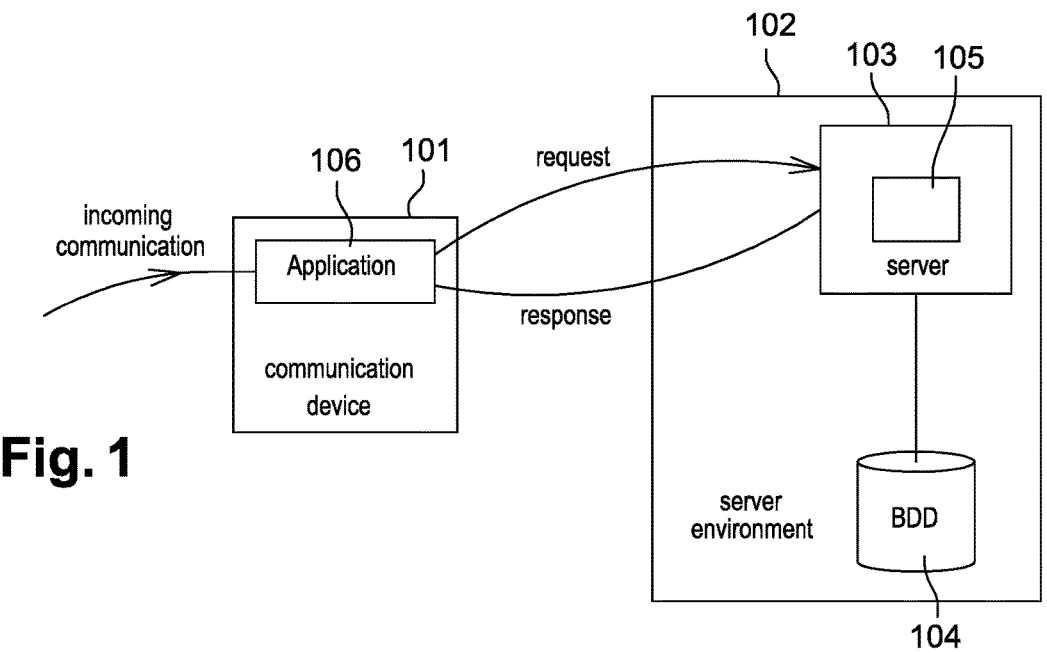
FIG. 1 is a block diagram illustrating a system for implementing the proposed process in one or more embodiments.

The advantages, and other features of the components disclosed herein, will become more readily apparent to those having ordinary skill in the art form. The following detailed description of certain preferred embodiments, taken in conjunction with the drawings, sets forth representative embodiments of the subject technology, wherein like reference numerals identify similar structural elements.

In addition, it should be apparent that the teaching herein can be embodied in a wide variety of forms and that any specific structure and/or function disclosed herein is merely representative. In particular, one skilled in the art will appreciate that an aspect disclosed herein can be implemented independently of any other aspects and that several aspects can be combined in various ways.

The present disclosure is described below with reference to functions, engines, block diagrams and flowchart illustrations of the methods, systems, and computer program according to one or more exemplary embodiments. Each described function, engine, block of the block diagrams and flowchart illustrations can be implemented in hardware, software, firmware, middleware, microcode, or any suitable combination thereof. If implemented in software, the functions, engines, blocks of the block diagrams and/or flowchart illustrations can be implemented by computer program instructions or software code, which may be stored or transmitted over a computer-readable medium, or loaded onto a general purpose computer, special purpose computer or other programmable data processing apparatus to produce a machine, such that the computer program instructions or software code which execute on the computer or other programmable data processing apparatus, create the means for implementing the functions described herein.

Embodiments of computer-readable media includes, but are not limited to, both computer storage media and communication media including any medium that facilitates transfer of a computer program from one place to another. As used herein, a "computer storage media" may be any physical media that can be accessed by a computer. Examples of computer storage media include, but are not limited to, a flash drive or other flash memory devices (e.g. memory keys, memory sticks, key drive), CD-ROM or other optical storage, DVD, magnetic disk storage or other magnetic storage devices, memory chip, RAM, ROM, EEPROM, smart cards, or any other suitable medium form that can be used to carry or store program code in the form of instructions or data structures which can be read by a computer processor. Also, various forms of computer-readable media may transmit or carry instructions to a computer, including a router, gateway, server, or other transmission device, wired (coaxial cable, fiber, twisted pair, DSL cable), wireless (infrared, radio, cellular, microwave), or virtual transmission devices (virtual routers, virtual gateways, virtual tunnel end points, virtual firewall). The instructions may comprise code from any computer-programming language or element of computer-programming, including, but not limited to, assembly, C, C++, Visual Basic, HyperText Markup Language (HTML), Extensible Markup Language (XML), HyperText Transfer Protocol (HTTP), Hypertext Preprocessor (PHP), SQL, MySQL, Java, JavaScript, JavaScript Object Notation (JSON), Python, and bash scripting.

Additionally, the word "exemplary", "for instance", "for example", "typically" as used herein means serving as an example, instance, or illustration. Any aspect or design described herein as "exemplary" is not necessarily to be construed as preferred or advantageous over other aspects or designs.

For purposes of this disclosure, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server. A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this subject disclosure, the term "network" should be understood to refer to as one or more data links that may couple devices so as to enable the transport of electronic data between computer systems and/or modules and/or other electronic devices, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

Unless specified or limited otherwise, the terms "operatively coupled," "coupled," "mounted," "connected," "supported," and formatives and variations thereof are used broadly and encompass both direct and indirect mountings, connections, supports, couplings, including a connection between devices and/or portions thereof that enables operation(s) in accordance with the proposed method. Further, "connected" and "coupled" are not restricted to physical or mechanical connections or couplings. For example, an operative coupling may include one or more of a wired connection and/or a wireless connection between two or more devices that enables a one and/or two-way communication path between the devices and/or portions thereof. In another example, an operative coupling may include a wired and/or wireless coupling to enable communication between a server of a server environment of the present system and one or more user devices.

Unless specified otherwise, the exemplary embodiments hereinafter will be described as applied to a mobile device operable to request and obtain, via a user application, e.g. a dialer application, from a server, qualification information on the nature of a caller party. The mobile device will also be referred to as a "user device," a "client device," or an "electronic device." A dialer application client hosted by said mobile device may be used to facilitate the obtaining qualification information.

The exemplary embodiments described herein are in no way a limitation of the scope of the present subject disclosure as the present teachings could be implemented for other electronic or telecommunication devices, such as computers, laptops, PDAs (Personal Digital Assistants), tablets, set top box, e-readers, and the likes. More generally any electronic device having communication means for, upon setup of a communication with a caller party, accessing a server environment over one or more telecommunication networks and obtaining therefrom qualification information on the nature of the caller party comprising likelihood indicators and reporting received likelihood indicators may benefit from the present teachings.

Unless specified or limited otherwise, the terms "application" or "application program" (AP) and variations thereof are used broadly and encompass any tool that functions and is operated by means of a computer, with the purpose of performing one or more functions or tasks for a user or another application program. To interact with and control an AP, a graphical user interface (GUI) of the AP may be displayed on the mobile device display, and/or an audio user interface of the AP may be reported to the user using a loudspeaker or a headphone or headset output.

Turning now to the figures, FIG. 1 is a block diagram of an embodiment wherein an electronic device 101 (also referred to hereinafter as a "computing device" or "client device") is configured for communicating with a server environment 102 comprising an application server 103 executing a incoming call analysis engine 105, over one or several networks (not shown on the figures) such as a wireless network (e.g. operated by a service provider of the device 101), and/or the Internet.

In one or several embodiments, the application server 103 may act as a server with respect to the client device 101 in operations of the proposed method.

Examples of such devices 101 include a laptop, a desktop, a mobile phone, a smartphone, a personal digital assistant, a tablet computer, a personal computer, a handheld messaging device, a laptop computer, a set-top box, a personal data assistant, an electronic book reader, and the like.

Depending on the embodiment, the device 101 and the server 103 may be interconnected and exchange data with each other via one or more communication links, using direct connections, for example using Near Field Communications (NFC) technology, and/or one or more networks which may take any possible form, such as a fixed network (e.g. PSTN), a cellular network (e.g. GSM, CDMA, CDMA2000, GPRS, EDGE, HSPA, UMTS, LTE, LTE-A), another type of radio-communication network (e.g. Wifi), an IP network, a combination of any one of the preceding networks, etc. To this end, the device 101 and the server 103 may be configured with appropriate communication means.

The device 101 may be configured for setting up a communication (including a voice communication, a data communication, and a video communication) with another party, including receiving data associated with the setup of a received communication (also referred to hereinafter as an "incoming communication") or, depending on the communication protocol used for setting up the communication, receiving control plane data or signaling data associated with the received communication or incoming communication, and for obtaining, upon setup of the received communication or incoming communication, from such received data or signaling data, identification information data for a caller party.

The device 101 may also be configured for transmitting to the server 103 of the server environment 102 a request for qualification of the nature of the caller party comprising the identifier of the caller party, for example using the HTTP protocol.

The server 103, which may be any type of device or system including computing means, such as a computer, a set of interconnected computers (cloud computing), etc., may be configured for receiving requests or calls from a client device such as the device 101, including requests for qualification of the nature of the caller party that include the identifier of the caller party.

In one or more embodiments, the server 103 may be provided with an Application Programming Interface (API) or any type of interface (not shown on the figure), configured for receiving requests for qualification of the nature of the caller party from various devices 101, such interface being operatively coupled to the incoming call analysis engine 105 for handing over received requests for further processing. The interface may also be configured for receiving requests or calls related to the spam detection application service provided by the server environment 102, e.g. a request carrying a user command to turn off spam detection.

The incoming call analysis engine 105 is operatively coupled to one or several databases 104, and may be configured to query such databases for qualification information on the nature of the caller party upon reception of a request handed over by the interface, that is, to provide the database with queries and identification information to which a query pertains. The incoming call analysis engine 105 may additionally be configured for populating the databases 104 with information, such as qualification information regarding different parties, for instance callers which may have been reported as spam.

The databases 104 may be configured to receive queries from the incoming call analysis engine 105, together with or including identification information to which the query pertains, and to generate, based on the identification information, qualification information on the nature of the caller party comprising respective likelihood indicators for each of one or more categories to which the caller party corresponds in a first group comprising a malicious category, a commercial category, and an acceptable category. The databases 104 may further be configured to provide the incoming call analysis engine 105 with generated qualification information, which incoming call analysis engine 105 may be configured to provide in turn the interface with generated qualification information, for such information to be transmitted to the device 101 as a response to its request for qualification of the nature of the caller party.

The device 101 may be configured for, upon reception of qualification information on the nature of the caller party comprising respective likelihood indicators for each of one or more categories to which the caller party corresponds in a first group comprising a malicious category, a commercial category, and an acceptable category in response to its request, reporting the likelihood indicators for each of the one or more categories through a user interface of the device 101, e.g. a graphical user interface and/or an audio user interface.

Figure 2:
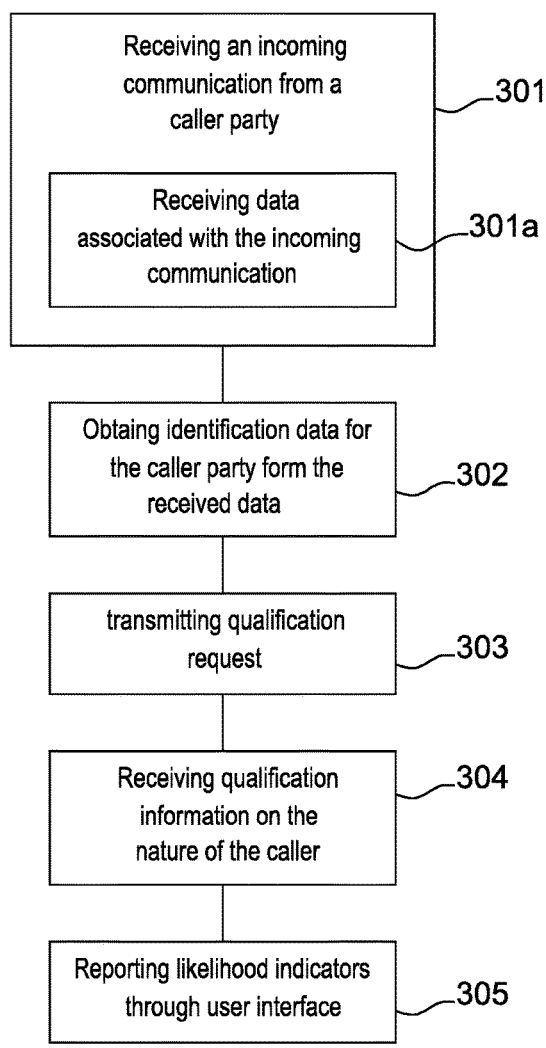
FIG. 2 is a flow diagram illustrating an exemplary embodiment of the proposed process.

Referring now to FIG. 2, a communication device receives at block 301 an incoming communication from a caller party. In one or more embodiments, the receiving 301 of a communication at the communication device may comprise the receiving 301a of data related to the incoming communication, e.g. signaling data associated with the setup or the establishment of the communication between the caller party and the called party.

For example, for a VoIP call, the communication device may receive one or more Session Initiation Protocol (SIP) messages associated with the setup of a Voice over IP (VoIP) communication.

Further to the receipt 301a of data related to the incoming communication, caller party identification data may be obtained (block 302) based on the received data.

Depending on the embodiment, caller party identification data may include an identification information data for the caller party (which may also be referred to herein as the calling party) or identification information data for the device used by the caller party, and may have different forms, such as, a caller subscriber number allocated by a service provider, a phone number, an address (such as, without limitation, an IP address, a SIP address, an Extensible Messaging and Presence Protocol (XMPP) address), an ISDN (Integrated Services Digital Network) number, a MS-ISDN (Mobile Subscriber ISDN) number, a mobile equipment identifier (MEID), an international mobile station equipment identity (IMEI), an electronic signature number (ESN), a resource identifier, a Jabber identifier, etc.

A request for qualification of the nature of the caller party comprising the identification data for the caller party may then be transmitted 303, depending on the embodiment, to a server environment which comprises at least one server.

The request may be transmitted to the server environment via a network which may take any possible form, such as a wireline network (e.g. PSTN), a cellular network (e.g. GSM, UMTS, LTE, LTE-A), another type of wireless network (e.g. Wifi, WiMAX), a packet network (e.g. an IP network or the Internet), an intranet, a Local Area Network, a Wide Area Network, an Ethernet network, or a combination thereof.

A description of embodiments of the processing of the request for qualification of the nature of the caller party and the generation of the response at the server is provided below in reference to FIG. 5.

Comprised in a response to the request, qualification information on the nature of the caller party is received (block 304), which comprises respective likelihood indicators for each of one or more categories to which the caller party corresponds in a group comprising a malicious call category, a commercial call category, and an acceptable call category.

In an embodiment, the qualification information comprises a first likelihood indicator providing an estimated likelihood that the incoming communication is malicious, and a second likelihood indicator providing an estimated likelihood that the incoming communication is acceptable.

In another embodiment, the qualification information comprises a first likelihood indicator providing an estimate likelihood that the incoming communication originates from a commercial platform (e.g. a telemarketing platform), and a second likelihood indicator providing an estimate likelihood that the incoming communication is acceptable.

Yet in another embodiment, the qualification information comprises a first likelihood indicator providing an estimate likelihood that the incoming communication is malicious, a second likelihood indicator providing an estimate likelihood that the incoming communication is acceptable, and a third likelihood indicator providing an estimate likelihood that the incoming communication originates from a commercial platform.

Incoming communication acceptability information that comprises the received likelihood indicators for each of the one or more categories is then reported (block 305) to a user of the communication device through a user interface, for example a graphical user interface, and/or an audio interface.

In one or more embodiments, the received qualification information comprises likelihood indicators for each of one or more categories to which the caller party corresponds in a second group comprising a malicious category and a commercial category. For example, depending on the embodiment, the received qualification information may comprise a likelihood indicator for the malicious category with no likelihood indicator for the commercial category, the received qualification information may comprise a likelihood indicator for the commercial category with no likelihood indicator for the likelihood category, or the received qualification information may comprise both a likelihood indicator for the malicious category and a likelihood indicator for the commercial category.

In such case, a likelihood indicator for the acceptable category may be determined at the communication device based on the received likelihood indicators.

For example, in an embodiment where the received qualification information comprises a likelihood indicator for the malicious category with no likelihood indicator for the commercial category, a likelihood indicator for the acceptable category may be determined based on the likelihood indicator for the malicious category. The likelihood indicator for the acceptable category may be determined by subtracting the likelihood indicator for the malicious category from a value representing certainty (e.g. 100%). In certain embodiments, an error margin of a predefined value (e.g. 10%) may also be taken into account for the determination of the likelihood indicator for the acceptable category, possibly according to the following formula: likelihood indicator for the acceptable category=100%−Error_margin−likelihood indicator for the malicious category.

The person having ordinary skill in the art would readily understand that the previous examples can be transposed to an embodiment where the received qualification information comprises a likelihood indicator for the commercial category with no likelihood indicator for the malicious category, instead of the other way around, so that a likelihood indicator for the acceptable category may be determined based on the likelihood indicator for the commercial category as described above with respect to the malicious category.

In an embodiment where the received qualification information comprises both a likelihood indicator for the malicious category and a likelihood indicator for the commercial category, a likelihood indicator for the acceptable category may be determined based on both of these received likelihood indicators. The likelihood indicator for the acceptable category may be determined by subtracting the likelihood indicator for the malicious category and the likelihood indicator for the commercial category from a value representing certainty (e.g. 100%). In certain embodiments, an error margin of a predefined value (e.g. 10%) may also be taken into account for the determination of the likelihood indicator for the acceptable category, possibly according to the following formula: likelihood indicator for the acceptable category=100%−Error_margin−likelihood indicator for the malicious category−likelihood indicator for the commercial category.

While the above embodiments have been described with respect to received qualification information which comprises one or both of a likelihood indicator for the malicious category and a likelihood indicator for the commercial category, a person having ordinary skill in the art would readily understand that the present subject disclosure is not limited to those embodiments, and may be applicable to any pair of likelihood indicators among a likelihood indicator for the commercial category, a likelihood indicator for the malicious category, and a likelihood indicator for the acceptable category.

In one or more embodiments, a global acceptability indicator may be determined at the communication device based on the received likelihood indicators received, and included in the incoming communication acceptability information which is reported through a user interface of the device.

Alternatively, a global acceptability indicator may be generated remotely and received at the communication device together with or separately from the received likelihood indicator(s).

In an embodiment, the global acceptability indicator may reflect the category with a highest likelihood indicator. For example, the global acceptability indicator may reflect the category for which a highest likelihood indicator has been received or determined.

In one or more embodiments where the communication device is provided with a touchscreen, the incoming communication acceptability information may be reported through displaying a graphical user interface on the touchscreen of the communication device, and the GUI displayed on the touchscreen may include a soft key for accepting the incoming communication, and a soft key for rejecting the incoming communication. In addition, or alternately, the GUI displayed on the touchscreen may include caller party identification data.

Information regarding the acceptability of the call can then advantageously be provided to a user of the device together with soft commands for rejecting or accepting the incoming communication to which the incoming communication acceptability information pertains.

In one or more embodiments, the received likelihood indicators may have been generated based on previous user reviews regarding the caller party. The received qualification information may then include a number of user reviews used for generating the received likelihood indicators. In such case, the incoming communication acceptability information reported through a user interface of the communication device may additionally include the number of user reviews.

Information on the number of user reviews will assist the user of the device in making a decision to accept or reject the incoming communication influenced by the reported likelihood indicators, possibly together with a global acceptability indicator.

Figure 3:
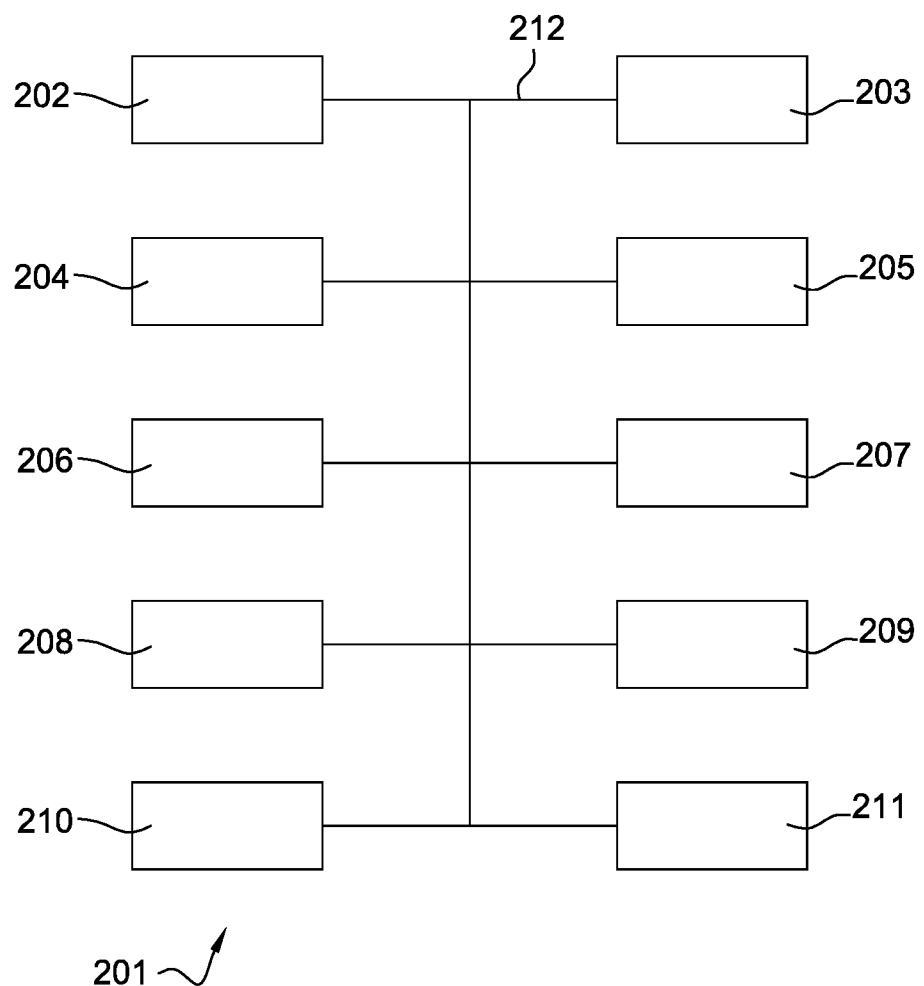
FIG. 3 is a block diagram illustrating an exemplary architecture of a communication device suitable for use according to one or several embodiments.

FIG. 3 shows an exemplary architecture of a communication device 201 suitable for use according to one or several embodiments.

The communication device 201 is an electronic device which may include circuitry for performing the main functions of a mobile phone (such as a mobile smartphone), a tablet computer, a laptop computer, a gaming console, a set-top-box, a personal computer, a wearable computing device, or the like.

In one or more embodiments, the communication device 201 may include one or more antennas 202, one or more transceiver units 203 for the transmission and reception of wireless signals, an output unit 204 that includes hardware such as an audio unit, a microphone, and/or a display screen, a clock unit 205, a power source unit 206 (e.g., battery, solar panel, wired power connection), a memory unit 207, an input unit 208 that includes hardware such as a keypad or touchscreen for receiving a user input, a mobile positioning unit, such as a GPS unit, for indicating the geographical location of the device 201, a communication bus 212, a communication application unit 210, an operating system (OS) unit 211, and a processor 209. Some output hardware 204 such as a display screen may include a touch sensitive screen (also referred to herein as a "touchscreen"). Accordingly, some output hardware 204 may provide input functionality and some input hardware 208 may provide output functionality. The memory 207 may include one or more memory circuits including non-volatile memory circuits (e.g., EEPROM, FLASH, etc.).

In the exemplary architecture illustrated on FIG. 3, all of the one or more antennas 202, one or more transceiver units 203, output unit 204, clock unit 205, power source unit 206, memory unit 207, input unit 208, processor 209, communication application unit 210, and OS unit 211 are operatively coupled with one another through the communication bus 212.

The one or more transceiver units 203 may each be configured for the transmission and reception of wireless signals corresponding to one or several wireless radio-communication system or standard, such as, without limitation, cellular wireless signals (e.g. GSM, GPRS, EDGE, CDMA, UMTS, LTE, and LTE-A), WiFi, WiMAX, Bluetooth, ZigBee, and the likes.

In one or more embodiments, the device 201 may also be configured for transmission and reception of light modulated signals using light modulation communication technologies, such as, example, Light Fidelity (Li-Fi). For example, the device 201 may include a camera (not shown on the figure) for receiving Li-Fi signals, and a light emitting device (not shown on the figure) for transmitting Li-Fi signals.

Depending on the embodiment, the processor 209 may be any suitable microprocessor, microcontroller, Field Programmable Gate Arrays (FPGA), Application Specific Integrated Circuits (ASIC), Digital Signal Processing chip, and/or state machine, or a combination thereof. The processor 209 may also be operatively coupled with non-transitory computer-readable storage media, such as, without limitation, the memory 207, capable of storing computer-readable program instructions or software code that, when executed by the processor 209, cause the communication device 201 to perform the functions described herein.

Depending on the capabilities of the communication device 201, and on the supporting telecommunication networks, the communication device 201 may also be configured to provide a range of voice and data communication services. As non-limiting examples the communication device 201 may be configured to provide telephone network based communication services including voice, multimedia and text messaging, as well as other data exchange capabilities, enabling Internet access and email exchange, for example.

In one or more embodiments, the communication device 201 may be configured to exchange data via one or several networks with remote servers, such as the server 103 illustrated on FIG. 1, and to enable data exchange enabling Internet access (e.g., data network).

The communication device 201 will also typically be provided with an operating system 211 that includes computer-executable program instructions for the general management of the device 201, possibly with additional operation management functions depending on the features provided in the device 201. In embodiments where the device 201 is a mobile device, the operating system 211 of the device 201 may be configured as a mobile operating system, with additional management functions related to mobile features of the device 201, such as the transmission and reception of wireless signals, the GPS mobile navigation feature, etc. Examples of mobile operating systems include Android (including all of its past, current or future releases, such as, without limitations, Cupcake, Éclair, Froyo, Gingerbread, Ice Cream Sandwich, Jelly Bean, KitKat, Lollipop, Marshmallow, and Nougat), and mobile operating systems based on Android or the Android Open Source Project (AOSP), such as, without limitations, Android Open Kang Project (AOKP), ColorOS, CyanogenMod, Cyanogen OS, Emotion User Interface (EMUI), Flyme OS, Sense, Mi User Interface (MIUI), UX, OxygenOS, TouchWiz, and ZenUI), iOS, Windows 10 Mobile, BlackBerry 10, Sailfish OS, Tizen, Ubuntu Touch OS, and H5OS.

In one or more embodiments, the communication device 201 may be operable to have one or more communication applications 210 (for voice, video, and/or data communications) or widgets installed, such as, but not limited to, dialer applications, messaging applications, social networking applications, and/or email applications, for example, for providing voice and data communications services. Each application or widget installed on the communication device 201 may have an associated graphical user interface.

Depending on the embodiment, parts or all of communications services featured in the communication device 201 may be provided for by the operating system 211 embedded in the communication device 201. For example, the OS 211 running on the device 201 may be configured to provide communication features such as control plane and/or data plane layer functions, such as, for example, as described by the OSI layer model. A communication application installed in the communication device 201 may then be configured to provide a complementary portion of control plane and/or data plane layer functions (e.g. and applicative layer function), and include an interface for exchanging data with the OS 211 of the device 201 for providing communication services.

In one or more embodiments, the OS 211 of the device 201 may be configured as an event-driven system that executes software code upon occurrence of respective predefined events (such as, without limitations, occurrence of an incoming communication), so that occurrence of an incoming communication, for example detected by the reception of data associated with an incoming communication, triggers an interrupt at the OS level, and generates a call from the OS 211 to the application 210 to hand over data associated with the incoming communication. In other embodiments, the OS 211 may indicate to the application 210 that data associated with an incoming communication is available in memory 207.

Depending on the embodiment, data associated with an incoming communication may include data associated with the setup or the establishment of a communication, control plane data or signaling data indicating a request for setting up or establishing a communication.

For example, in the case of a voice communication, data associated with an incoming communication may include an incoming call message or a call setup request message, such as, without limitations, an application-layer control protocol message of the Session Initiation Protocol (SIP) "Invite" message type.

The communication application 210 installed on the device 201 may be configured to obtain data associated with the incoming communication, and extract therefrom caller party identification data.

For example, the Android mobile OS includes a so-called "TelephonyManager" API to detect call events, among which an incoming call event. The reception of an incoming call will trigger an interrupt ("intent") that will execute specific code through the TelephonyManager API.

The TelephonyManager API also provides calls for obtaining the phone number of the caller party.

In one or more embodiments, the communication application 210 may be configured to generate a request for qualification of the nature of the caller party comprising the caller party identification data, and to transmit such request to a server environment according to the present subject disclosure.

The communication application 210 may be appropriately configured for exchanging data with a server environment according to the present subject disclosure, in view of the communication protocol(s) used for such data exchange, examples of which may include the HTTP protocol, as shown in the below, non-limiting, sample code example:

```
POST /reportspam HTTP/1.1
Host: myserver.com
Accept: */*
Content-Length: 73
Content-Type: application/json
("token":"EZDSXdfdfvd","timestamp":1482220939576,"spammer":
"0611111111"}
HTTP/1.1 200 OK
Access-Control-Allow-Origin: *
Content-Type: application/json; charset=utf-8
Content-Length: 15
```

```
Date: Tue, 20 Dec 2016 08:03:25 GMT
Connection: keep-alive
("status": "OK")
```

The communication application 210 may further be configured to receive, as a response to the request for qualification of the nature of the caller party, for example from the server environment, qualification information on the nature of the caller party comprising respective likelihood indicators for each of one or more categories to which the caller party corresponds in a first group comprising a malicious category, a commercial category, and an acceptable category.

The communication application 210 may be further configured to communicate with the output unit 204 of the device 201 so as to convey to the user of the device 201 the likelihood indicators for each of the one or more categories through a user interface of the output unit 204, such as, a graphical user interface, and/or an audio user interface.

Figure 4:
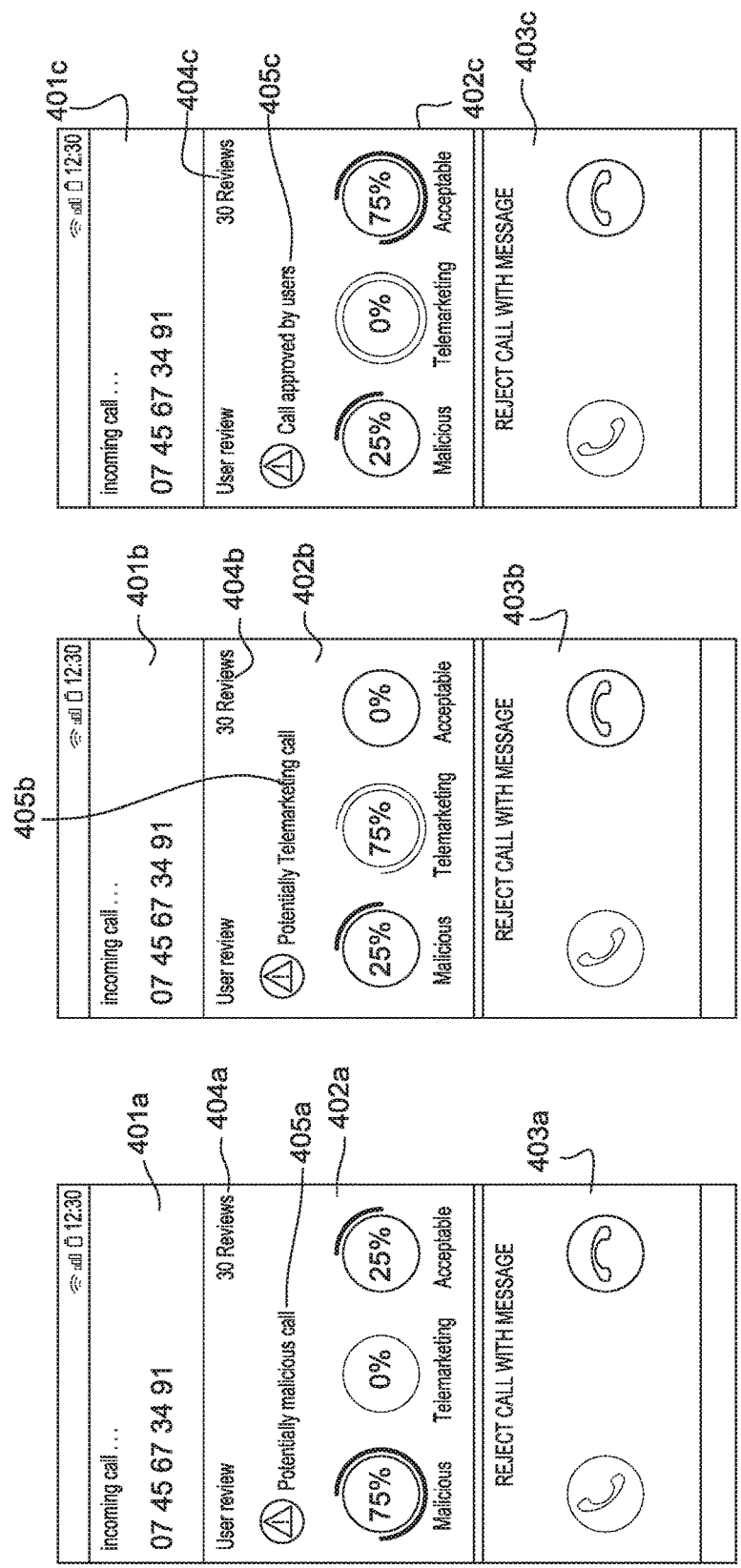
FIGS. 4a, 4b, and 4c illustrate exemplary GUI displays reporting the likelihood indicators according to one or several embodiments.

FIGS. 4a, 4b, and 4c show exemplary GUI displays reporting the likelihood indicators according to one or more embodiments.

FIGS. 4a, 4b, 4c show exemplary GUI displays of a communication device (e.g. a touchscreen of a smartphone device) to inform the user of the device of an incoming call.

In each case information indicating reception of an incoming call ("Incoming call" notice) and a caller party identification (in the illustrated example a calling party phone number) is displayed in an upper portion 401a, 401b, 401c of the display.

Once the nature of the incoming call has been analyzed, the results of the analysis may be reported to the user of the device as categorized among three categories: "Malicious," "Telemarketing," and "Acceptable." For each of these categories, a likelihood indicator is provided that indicates an estimated likelihood that the incoming call belongs to the respective category.

For example, three likelihood indicators are reported in a medium portion 402a of the display shown on FIG. 4a: 75% for the category "Malicious" calls, 0% for the category "Telemarketing" calls, and 25% for the category "Acceptable" calls. A global acceptability indicator 405a that is determined based on the category with the highest likelihood indicator is also displayed in this medium portion 402a: "Potentially malicious call."

Three different likelihood indicators are reported in a medium portion 402b of the display shown on FIG. 4b: 25% for the category "Malicious" calls, 75% for the category "Telemarketing" calls, and 0% for the category "Acceptable" calls. A different global acceptability indicator 405b that is determined based on the category with the highest likelihood indicator is also displayed in this medium portion 402b: "Potentially telemarketing call."

Yet three different likelihood indicators are reported in a medium portion 402c of the display shown on FIG. 4c: 25% for the category "Malicious" calls, 0% for the category "Telemarketing" calls, and 75% for the category "Acceptable" calls. A different global acceptability indicator 405c that is determined based on the category with the highest likelihood indicator is also displayed in this medium portion 402c: "Call approved by users."

In each case illustrated on FIGS. 4a-4c, the displayed GUI is configured so that the likelihood indicator is displayed as a percentage next to the name of the category to which it corresponds. Preferably, the likelihood indicator is displayed as a percentage enclosed in a circle form placed above the name of the category to which it corresponds.

In a lower portion 403a, 403b, 403c of the display shown on FIGS. 4a-4c, two virtual buttons (also typically referred to as soft buttons, soft keys or soft commands) are reported: one commanding acceptance of the incoming call, and one commanding rejection of the incoming call.

The global acceptability indicator may advantageously be displayed above the likelihood indicators, in order to facilitate the decision making process by the user of the device who needs to make a prompt decision as to whether to accept or reject the call, based on the call acceptability information provided on the GUI display.

In the examples illustrated on FIGS. 4a-4c, the call acceptability information reported through the GUI interface includes the likelihood indicators, the names of the categories respectively corresponding to the likelihood indicators, and the global acceptability indicator.

In one or more embodiments, the GUI interface may also report a number of user reviews (404a, 404b, 404c on FIGS. 4a-4c), which may correspond to a number of user reviews based on which the received qualification information has been generated, at least partially.

This reporting of a number of users advantageously helps the user to evaluate a level of confidence that may be associated with the incoming communication acceptability information reported.

As a user receiving an incoming communication may need to promptly decides whether to accept or to reject the communication, combining various incoming communication acceptability information, such as, different likelihood indicators, a global acceptability indicator determined based on the likelihood indicators, and a level of confidence associated with the likelihood indicators, may be of great help to the user for this decision-making process.

Figure 5:
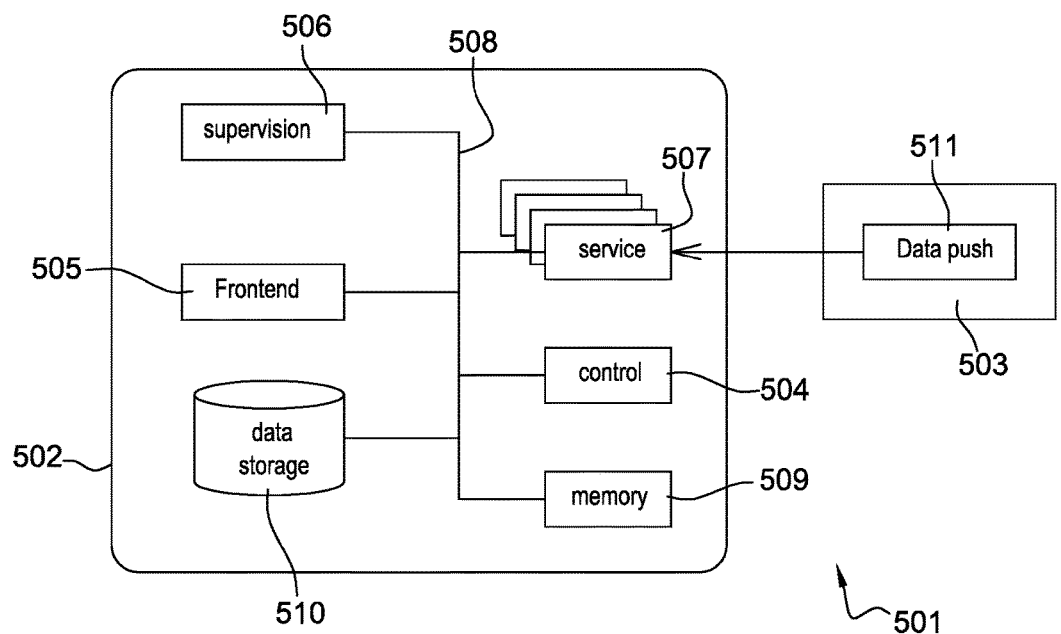
FIG. 5 is a block diagram illustrating an exemplary architecture of a server environment suitable for use according to one or several embodiments.

FIG. 5 shows an exemplary architecture of a server environment 501 suitable for use in accordance with embodiments of the present subject disclosure.

In one or several embodiments, the server environment 501 may be a cloud-based environment.

In one or more embodiments, the server environment 501 includes an application server 502 and one or several region specific data servers 503. Alternately, the server environment may include only an application server 502 serving as a back-end server for communication devices configured for implementing the method proposed herein.

The application server includes a control engine 504, a frontend engine 505, a supervision engine 506, one or several service engines 507, a communication bus 508, a memory 509, and data storage 510.

In the architecture illustrated on FIG. 5, all of the control engine 504, frontend engine 505, supervision engine 506, one or several instances of service engine 507, communication bus 508, memory 509 and data storage 510 are operatively coupled with one another through the communication bus 508.

In one or more embodiments, the frontend engine 505 provides a frontend interface function for communication with communication devices configured for implementing the method proposed herein, e.g. client devices as described above. To that end, the frontend interface function may include operating upon reception of requests originated from a client device, and transmission of responses to such requests. The frontend engine 505 may in particular include an Application Program Interface (API), for example in the form of computer-readable instructions stored in the memory which, when executed by a processor of the application server, provide an interface configured for communicating with a client device, including receiving requests from a client device, and returning corresponding responses that include qualification information to such client device.

In one or more embodiments, the frontend API may be configured to process requests or calls originated by client devices and respond to such requests with messages in a format according to the HyperText Transfer Protocol (HTTP). Data included in HTTP messages exchanged between a client device and the server environment may also be represented using the JavaScript Object Notation (JSON) format.

In one or more embodiments, each instance of service engine 507 may be configured with respective service logic to be used for the processing of various requests received by the application server 502. Examples of service logics provided by respective service engines 507 include performance of a spam detection analysis, import of data related to callers reported as spam, and processing of client device's user originated application management commands.

The control engine 504 includes a processor, which may be any suitable microprocessor, microcontroller, Field Programmable Gate Arrays (FPGA), Application Specific Integrated Circuits (ASIC), Digital Signal Processing chip, and/or state machine, or a combination thereof. According to various embodiments, the application server can be configured as a multiprocessor computer having multiple processors for providing parallel computing. The control engine 504 may also comprise, or may be in communication with, computer storage media, such as, without limitation, the memory 509, capable of storing computer-readable program instructions or software code that, when executed by the processor(s), cause the application server 502 to perform the functions described herein. The memory 509 may be any type of non-transitory computer-readable storage medium coupled to the control engine 504.

The supervision engine 506 is configured to provide supervision functions of the application server 502, such as, for example, operation management of the application server 502.

The data storage engine 510 may be any device or combination of devices configured for storing and retrieving data using data write and/or read operations, and may include one or several of a memory device, data farm, database, data storage medium, or a combination thereof. An instance of a service engine 507 may be configured to provide the business logic for data storage, access, and retrieval in cooperation with the data storage 510, and may be further configured for generating qualification information using caller party identification data received from a communication device.

The data storage engine 510 may include one or several data tables, databases, populated with data representing user reviews received for users regarding a caller. In one or more embodiments, the data storage engine 510 may include one or several look-up tables with entries comprising an identifier and a number of user reviews received for each qualification in a group of categories comprising a malicious category, a commercial category, and an acceptable category. For example, the data storage engine 510 may include a table with entries comprising a phone number and the number of user reviews received indicating that the phone number is associated with a malicious caller, a commercial caller, and an acceptable caller.

The data storage engine 510 may include one or several data tables, databases, populated with data provided by users regarding qualification in a group of categories comprising a malicious category, a commercial category, and an acceptable category, in which they declare themselves.

The data storage engine 510 may be populated with data received from users and/or data populating other databases and pushed therefrom, such as, for example, region specific databases containing data collected for a specific region or area, comprising identifiers and one or more corresponding qualifications in a group of categories comprising a malicious category, a commercial category, and an acceptable category.

In one or more embodiments, the data storage engine 510 may include one or several data tables, databases that qualify identifiers (e.g. phone numbers) by rating them as to their likelihood of being malicious or commercial (nuisance) which may be populated from various sources, such as information gathered by fraud departments on known problem number ranges, such as premium rate ranges or ranges associated with previously reported fraud or malicious behavior, numbers that are "crowdsourced", or collected by reporting from a community of users. These numbers are classified based on the number of individual and unrelated subscribers who have reported the number as problematic so as to avoid improper reporting, and third party sources of numbers, such as commercial databases of telemarketing companies.

Since the user needs to make a decision on whether to accept or reject the incoming communication, it is desirable that latency is low. For example, the application server 502 may be configured so that the caller party identification data (e.g. incoming call number) is sent, qualified and received within a few hundreds of milliseconds.

In one or more embodiments, the latency associated with the service provided by the server environment 501 may be reduced by providing a fast-access memory for caching frequently accessed numbers on communication devices and/or in the application server 502, for example in the frontend API thereof.

In one or more embodiments, the latency associated with the service provided by the server environment 501 may also be reduced by optimizing storage and especially retrieval of data from the data storage engine 510. To that end, NoSQL database platforms that are optimized for in-memory storage and fast read times may be used in the data storage engine 510.

In one or more embodiments, the latency associated with the service provided by the server environment 501 may also be reduced by using optimized network protocols, and sequences that minimize connection setup times, compact requests and data transfer, such as, for example, the MQ Telemetry Transport (MQTT) data transport protocol, the Bencode data transfer protocol, or the BSON data exchange protocol, or using websockets for connection time saving (headers are not repeated and connection is maintained across requests).

It will be appreciated that the application server 502 shown and described with reference to FIG. 5 is provided by way of example only. Numerous other architectures, operating environments, and configurations are possible. Other embodiments of the application server 502 may include fewer or greater number of components, and may incorporate some or all of the functionality described with respect to the components shown in FIG. 5. Accordingly, although the control engine 504, frontend engine 505, supervision engine 506, one or several instances of service engine 507, communication bus 508, memory 509 and data storage 510 are illustrated as part of the application server 502, no restrictions are placed on the location and control of components 504-510. In particular, in other embodiments, components 504-510 may be part of different entities or computing systems.

In one or more embodiments, the architecture of the region specific data server 503 may be similar to that described above with respect to the application server 502. That is, the region specific data server 503 may include a control engine, a frontend engine, a supervision engine, one or several instances of service engine, a communication bus, a memory, and a data storage (not shown on FIG. 5).

A service engine of the region specific data server 503 may be configured as a data push service engine 511 to provide a function of pushing region specific data stored in the data storage of the region specific data server 503 to the data storage 510 of the application server 502, possibly after data authentication and/or formatting provided by a service engine 507 of the application server 502.

In one or more embodiments, the region specific server 503 is configured to provide the following functions/features:
 compliance with the legislation of the corresponding country/region regarding data location;
 implementation of region specific-services, such as mobile operator authentication; and
 put the data closer to the end user The region specific server may be configured with a database, which contains:
 country-specific data. Such data can be pushed in some embodiments to the application server 502 (in accordance with the country legislation) to improve the quality of the qualification information generation algorithms executed by the application server 502;
 data from the application server 502, for data caching purposes.

Each of the servers 502-503 will typically include an operating system (not shown on FIG. 5) that provides computer-executable instructions or data structures which can be accessed by a processor of that server for the general operations of the server, such as data storage management, processing resource management, etc., and will include a non-transitory computer-readable storage device storing such computer-executable instructions or data structures.

The server environment 501 shown on FIG. 5 is a distributed computing environment with several servers 502-503 that are interconnected via appropriate communication links, using one or several computer networks or direct connections. It will be appreciated by those having ordinary skill in the relevant art that such illustration is merely representative, and that the server environment 501 could be implemented with fewer or a greater number of components than shown on FIG. 5.

Likewise, it will be appreciated by those having ordinary skill in the relevant art that one or more components of the server environment 501 may be implemented as a virtual machine (VM) of a virtual environment running on a host computer system, the virtual environment comprising a management software, such as a hypervisor software, for managing hardware resources and virtual machines.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or d" is intended to cover: a, b, c, a-b, a-c, b-c, and a-b-c.

As used herein, the term "message" encompasses a wide variety of formats for representing information for transmission. A message may include a machine readable aggregation of information such as an XML document, fixed field message, comma separated message, or the like. While recited in the singular, it will be understood that a message may be composed, transmitted, stored, and/or received in multiple parts.

As used herein an "interface" (e.g., graphical user interface) may include a web-based interface including data fields for receiving input signals or providing electronic information. The interface may be implemented in whole or in part using technologies such as HTML, Flash, Java, .net, web services, and RSS. In some implementations, the interface may be included in a stand-alone client (for example, thick client, fat client) configured to communicate in accordance with one or more of the aspects described.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules, units, engines, and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions, blocks, modules, units, engines, and circuits described herein may be implemented in hardware, software, firmware, or any combination thereof. If implemented in software, they may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a device as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a device can obtain the various methods upon coupling or providing the storage means to the device. Moreover, any other suitable technique for providing the methods and techniques described herein to a device can be utilized.

While the invention has been described with respect to preferred embodiments, those skilled in the art will readily appreciate that various changes and/or modifications can be made to the invention without departing from the scope of the invention as defined by the appended claims. In particular, the invention is not limited to specific embodiments regarding the client device or server environment and may be implemented using various architecture or components thereof without departing from its scope as defined by the appended claims.

Although this invention has been disclosed in the context of certain preferred embodiments, it should be understood that certain advantages, features and aspects of the systems, devices, and methods may be realized in a variety of other embodiments. Additionally, it is contemplated that various aspects and features described herein can be practiced separately, combined together, or substituted for one another, and that a variety of combination and sub-combinations of the features and aspects can be made and still fall within the scope of the invention. Furthermore, the systems and devices described above need not include all of the modules and functions described in the preferred embodiments.

Information and signals described herein can be represented using any of a variety of different technologies and techniques. For example, data, instructions, commands, information, signals, bits, symbols, and chips can be represented by voltages, currents, electromagnetic waves, magnetic fields or particles, optical fields or particles, or any combination thereof.

Depending on the embodiment, certain acts, events, or functions of any of the methods described herein can be performed in a different sequence, may be added, merged, or left out all together (e.g., not all described acts or events are necessary for the practice of the method). Moreover, in certain embodiments, acts or events may be performed concurrently rather than sequentially.

An exemplary embodiment of the present disclosure provides a system, processor and method that overcomes disadvantages and/or make improvements in the prior art.

An exemplary embodiment provides a method for assisting users in avoiding the inconveniences associated with undesired calls.

Although the present disclosure has been described with reference to one or more examples, workers skilled in the art will recognize that changes may be made in form and detail without departing from the scope of the disclosure and/or the appended claims.

The invention claimed is:

1. A method for processing data associated with a caller party upon setup of an incoming communication, the method comprising, at a communication device:
    obtaining, from received signaling data associated with the communication, caller party identification data;
    transmitting a request for qualification of a nature of the caller party comprising the caller party identification data;
    receiving, in response to the request, qualification information on the nature of the caller party comprising respective likelihood indicators for each of one or more categories to which the caller party corresponds in a first group comprising a malicious category, a commercial category, and an acceptable category;
    reporting incoming communication acceptability information that comprises the likelihood indicators for each of the one or more categories through a user interface of the communication device.

2. The method according to claim 1, wherein the caller party identification data is obtained from received signaling data associated with the setup of the communication.

3. The method according to claim 1, wherein the reporting the likelihood indicators is performed through at least one of a graphical user interface or an audio user interface of the communication device.

4. The method according to claim 1, wherein the receiving the qualification information further comprises: receiving first, second, and third likelihood indicators for each of the malicious category, the commercial category, and the acceptable category.

5. The method according to claim 1, wherein the receiving the qualification information further comprises: receiving likelihood indicators for each of one or more categories to which the caller party corresponds in a second group comprising a malicious category and a commercial category; the process further comprising: determining a likelihood indicator for the acceptable category based on the received likelihood indicators.

6. The method according to claim 1, further comprising: determining a global acceptability indicator based on the received likelihood indicators, wherein the reported incoming communication acceptability information includes the global acceptability indicator.

7. The method according to claim 1, wherein the incoming communication acceptability information is reported through displaying a graphical user interface on a touchscreen of the communication device, wherein the GUI displayed on the touchscreen includes a soft key for accepting the incoming communication, and a soft key for rejecting the incoming communication.

8. The method according to claim 1, wherein the incoming communication acceptability information is reported through displaying a graphical user interface on a touchscreen of the communication device, wherein the GUI displayed on the touchscreen includes caller party identification data.

9. The method according to claim 1, wherein the qualification information includes a number of user reviews used for generating the received likelihood indicators, and wherein the reported incoming communication acceptability information includes the number of user reviews.

10. A communication device comprising:
    a processor; and
    a non-transitory computer-readable memory operatively coupled to the processor and comprising program code instructions stored thereon, which when executed by the processor configure the communication device to perform a method for processing data associated with a caller party upon setup of an incoming communication, the method comprising the following acts performed by the communication device:
    obtaining, from received signaling data associated with the communication, caller party identification data;
    transmitting a request for qualification of a nature of the caller party comprising the caller party identification data;
    receiving, in response to the request, qualification information on the nature of the caller party comprising respective likelihood indicators for each of one or more categories to which the caller party corresponds in a first group comprising a malicious category, a commercial category, and an acceptable category;
    reporting incoming communication acceptability information that comprises the likelihood indicators for each of the one or more categories through a user interface of the communication device.

11. A non-transitory computer-readable storage medium storing a computer program that, when executed, causes a system comprising a processor operatively coupled with a memory, to perform a method for processing data associated with a caller party upon setup of an incoming communication, the method comprising:
    obtaining, from received signaling data associated with the communication, caller party identification data;
    transmitting a request for qualification of a nature of the caller party comprising the caller party identification data;
    receiving, in response to the request, qualification information on the nature of the caller party comprising respective likelihood indicators for each of one or more categories to which the caller party corresponds in a first group comprising a malicious category, a commercial category, and an acceptable category;
    reporting incoming communication acceptability information that comprises the likelihood indicators for each of the one or more categories through a user interface of a communication device.

12. A server device comprising:
    a processor;
    a database operatively coupled to the processor; and
    a non-transitory computer-readable memory operatively coupled to the processor and comprising program code instructions stored thereon, which when executed by the processor configure the server device to perform the following acts:

receive a request for qualification of a nature of a caller party, the request comprising caller party identification data;

generate, based on the caller party identification data, using data stored in the database, qualification information on the nature of the caller party comprising respective likelihood indicators for each of one or more categories to which the caller party corresponds in a first group comprising a malicious category, a commercial category, and an acceptable category; and transmit the qualification information to a communication device.

* * * * *